US012248211B2

(12) United States Patent
Nagatani (10) Patent No.: US 12,248,211 B2
(45) Date of Patent: Mar. 11, 2025

(54) DISPLAY DEVICE HAVING A CURVED SHAPE IN SECTION ALONG ONE AXIS

(71) Applicant: Saturn Licensing LLC, New York, NY (US)

(72) Inventor: Shinpei Nagatani, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/409,213

(22) PCT Filed: May 31, 2013

(86) PCT No.: PCT/JP2013/065253
§ 371 (c)(1),
(2) Date: Dec. 18, 2014

(87) PCT Pub. No.: WO2014/002688
PCT Pub. Date: Jan. 3, 2014

(65) Prior Publication Data
US 2015/0168768 A1    Jun. 18, 2015

(30) Foreign Application Priority Data

Jun. 29, 2012   (JP) ................. 2012-147323
Oct. 30, 2012   (JP) ................. 2012-238707

(51) Int. Cl.
*G02F 1/1333*    (2006.01)
*G02F 1/13357*    (2006.01)
*G06F 1/16*    (2006.01)
*H04N 5/64*    (2006.01)

(52) U.S. Cl.
CPC ...... *G02F 1/133308* (2013.01); *G02F 1/1333* (2013.01); *G02F 1/133615* (2013.01); *G06F 1/1601* (2013.01); *H04N 5/64* (2013.01); *G02F 1/133314* (2021.01)

(58) Field of Classification Search
None
See application file for complete search history.

(56) References Cited

U.S. PATENT DOCUMENTS

| 7,436,140 B2 | 10/2008 | Takaji et al. |
| 7,614,596 B2 | 11/2009 | Takao |
| 7,667,891 B2 * | 2/2010 | Cok ...................... G03B 21/56 345/82 |
| 7,847,912 B2 | 12/2010 | Nishizawa et al. |

(Continued)

FOREIGN PATENT DOCUMENTS

| CN | 1921025 A | 2/2007 |
| CN | 1945748 A | 4/2007 |

(Continued)

OTHER PUBLICATIONS

English machine translation of JP 11-38395 A.*

(Continued)

*Primary Examiner* — Lauren Nguyen
(74) *Attorney, Agent, or Firm* — Richard LaPeruta (57) ABSTRACT

A display device includes a display panel having a curved shape in section along one axis, the display panel including a display screen that includes a concave surface, wherein a radius of curvature (R) of the curved shape of the display screen is larger than 2000 mm.

22 Claims, 9 Drawing Sheets

(56) References Cited

U.S. PATENT DOCUMENTS

| | | |
|---|---|---|
| 2002/0027636 A1 | 3/2002 | Yamada |
| 2004/0239890 A1 | 12/2004 | Starkweather |
| 2006/0117623 A1* | 6/2006 | Watanabe ............... F16M 13/02 |
| | | 40/606.15 |
| 2006/0284034 A1 | 12/2006 | Takaji et al. |
| 2007/0010377 A1 | 1/2007 | Wu et al. |
| 2007/0103776 A1 | 5/2007 | Cok et al. |
| 2008/0303976 A1 | 12/2008 | Nishizawa et al. |
| 2009/0121097 A1 | 5/2009 | Takao |
| 2009/0167192 A1 | 7/2009 | Diederiks et al. |
| 2009/0168455 A1* | 7/2009 | Kim ..................... G02B 6/0068 |
| | | 362/613 |
| 2009/0289877 A1 | 11/2009 | Kwon et al. |
| 2010/0020251 A1 | 1/2010 | Kadijk et al. |
| 2010/0053229 A1 | 3/2010 | Krijn et al. |
| 2011/0018462 A1* | 1/2011 | Lowe ..................... F21V 23/04 |
| | | 315/294 |
| 2013/0321740 A1* | 12/2013 | An ...................... H05K 5/0217 |
| | | 349/58 |
| 2014/0009914 A1* | 1/2014 | Cho ..................... G09F 9/35 |
| | | 361/679.01 |

FOREIGN PATENT DOCUMENTS

| | | |
|---|---|---|
| CN | 2907125 Y | 5/2007 |
| CN | 101216635 | 7/2008 |
| CN | 201114480 Y | 9/2008 |
| CN | 201118801 Y | 9/2008 |
| CN | 101298897 A | 11/2008 |
| CN | 101344651 | 1/2009 |
| CN | 101542342 A | 9/2009 |
| CN | 101697262 A | 4/2010 |
| CN | 101915999 A | 12/2010 |
| CN | 201805495 U | 4/2011 |
| CN | 102054399 A | 5/2011 |
| CN | 102109081 A | 6/2011 |
| CN | 102129814 A | 7/2011 |
| JP | H06245288 A | 9/1994 |
| JP | 11-38395 A | 2/1999 |
| JP | 2002350999 A | 12/2002 |
| JP | 2006023676 A | 1/2006 |
| JP | 2006-350145 A | 12/2006 |
| JP | 2007272107 A | 10/2007 |
| JP | 2008505350 A | 2/2008 |
| JP | 2008160236 A | 7/2008 |
| JP | 2008177861 A | 7/2008 |
| JP | 2008-304535 A | 12/2008 |
| JP | 2009038446 A | 2/2009 |
| JP | 4253350 B1 | 4/2009 |
| JP | 2009093000 | 4/2009 |
| JP | 2009224880 A | 10/2009 |
| JP | 2009282521 A | 12/2009 |
| JP | 2010-511199 A | 4/2010 |
| JP | 2010512677 A | 4/2010 |
| JP | 2011193069 A | 9/2011 |
| KR | 20100028326 A | 3/2010 |
| RU | 2439638 C2 | 1/2012 |
| WO | 2004064017 A1 | 7/2004 |
| WO | 2011073817 A1 | 6/2011 |

OTHER PUBLICATIONS

Roseller Sunga, The Complete Circular Arc Calculator, Feb. 20, 2018, "http://www.handymath.com/cgi-bin/arc18.cgi".*

International Search Report from Intenational Publication PCT/JP2013/065253 mailed Sep. 3, 2013.

EP Office Action for Application No. 13810516.8 dated Dec. 16, 2016.

Russian Office Action for Application No. 2014152101, dated Apr. 18, 2017.

Chinese Office Action for Application No. 2013800328679, dated Mar. 30, 2017.

* cited by examiner

DISPLAY DEVICE HAVING A CURVED SHAPE IN SECTION ALONG ONE AXIS

CROSS-REFERENCE TO RELATED APPLICATION

The present application is a national phase entry under 35 U.S.C. § 371 of International Application No. PCT/JP2013/065253 filed May 31, 2013, published on Jan. 3, 2014 as WO 2014/002688 A1, which claims priority from Japanese Patent Application Nos. JP 2012-147323 filed in the Japanese Patent Office on Jun. 29, 2012, and JP 2012-238707 filed in the Japanese Patent Office on Oct. 30, 2012.

TECHNICAL FIELD

The present disclosure relates to a display device suitable to a large-sized television set or the like.

BACKGROUND ART

Display devices such as television receivers or personal computer (PC) monitors have been shifted from cathode ray tubes to flat panel displays (FPDs) typified by liquid crystal or plasma displays, and currently FPDs are dominant. The reasons are as follows; while a picture source is a planar image in one plane cut from space, cathode ray tubes involve convex transformation, have limitations in upsizing, or have difficulties in coping with enhancement of display resolution.

In such FPDs, for example, a display main body including a display screen is supported in a predetermined posture state by a stand or the like, and moreover, on both the right and the left sides of the display screen, speakers are provided (for example, Patent Literatures 1 and 2).

CITATION LIST

Patent Literature

Patent Literature 1: JP 4253350B1
Patent Literature 2: JP 2006-350145A

SUMMARY OF INVENTION

In recent years, it is desired to achieve a display device capable of attaining a curved shape that, as typified by 3D display, when a viewer (an observer) sees a display image, gives feeling of immersion in the display image by three-dimensional feeling, a sense of unity, or feeling of presence, or a curved shape that may be used for other various applications.

It is therefore desirable to provide a display device that makes it possible to give an observer feeling of immersion in a display image.

A display device according to an embodiment of the present disclosure includes a display panel having a curved shape in section along one axis, the display panel including a display screen that includes a concave surface, wherein a radius of curvature (R) of the curved shape of the display screen is larger than 2000 mm.

In the display device according to the above-described embodiment of the present disclosure, in the display panel having the predetermined curved shape, the radius of curvature (R) of the curved shape of the display screen is larger than 2000 mm. Thus, cracking of the display panel is restrained and the curved shape is maintained.

According to the display device according to the above-described embodiment of the present disclosure, in the display panel having the predetermined curved shape, the radius of curvature (R) of the curved shape of the display screen is larger than 2000 mm. Hence, it is possible to restrain cracking of the display panel and to maintain the curved shape. It is possible to attain curved shapes according to applications, such as a gently curved shape that gives, for example, visually three-dimensional feeling, a sense of unity, or feeling of presence, or the like without uncomfortable feeling, or a curved shape that surrounds an entire visual field of a user. It is therefore possible to obtain a desired curved shape as well as to maintain manufacturing properties.

DESCRIPTION OF EMBODIMENTS

In the following, some embodiments of the present disclosure will be described in detail with reference to the drawings. It is to be noted that description will be made in the following order.

Embodiment (Example of Liquid Crystal Display Device)
1. Configuration
1-1. Configuration of Liquid Crystal Panel
1-2. Configuration of Speaker Section
1-3. Configuration of Stand
1-4. Configuration of Belt-like Illumination Section
2. Functions and Effects

Embodiment (Configuration)

Figure 1:
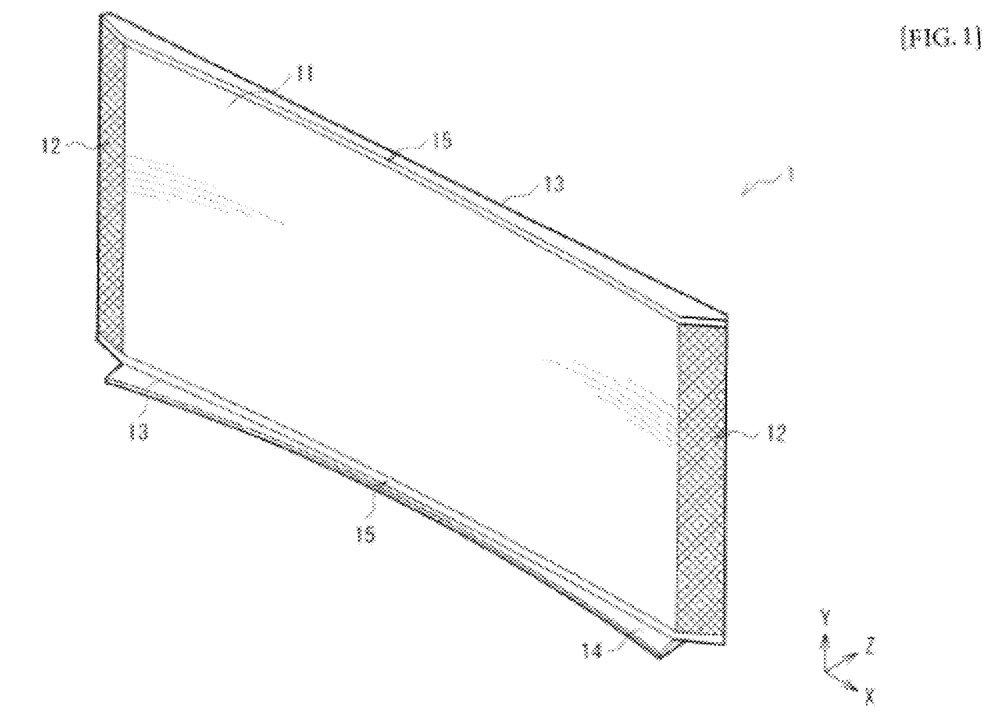
FIG. 1 is a perspective view illustrating one example of an appearance of a display device according to an embodiment of the present disclosure, viewed from a front surface side.
Figure 2:
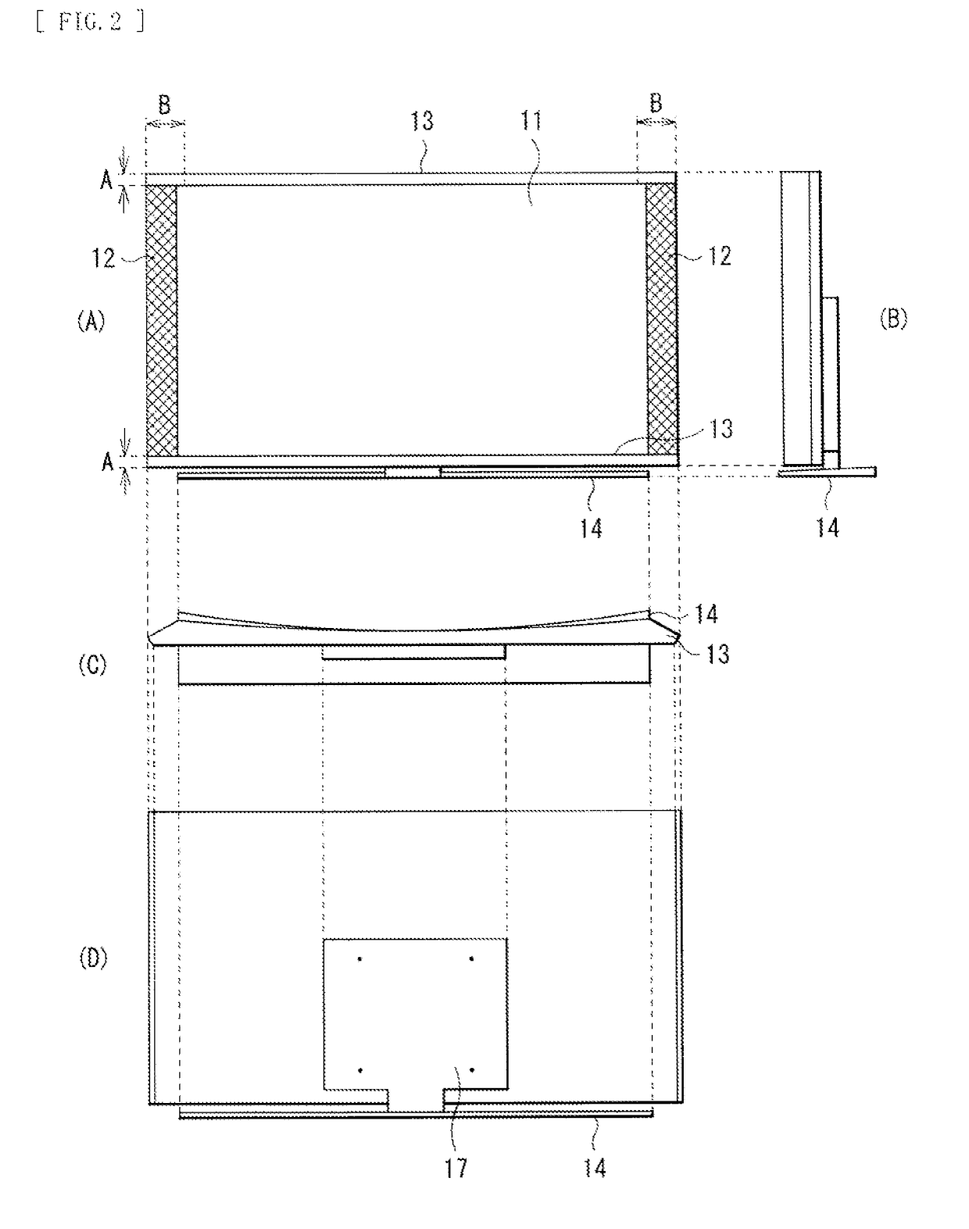
FIG. 2 is a front view (A), a side view (B), a top view (C), and a rear view (D) of the display device illustrated in FIG. 1.

FIG. 1 illustrates an appearance of a display device (a display device 1) according to an embodiment of the present disclosure, viewed from a front surface side. (A) to (D) of FIG. 2 illustrate a front view, a side view, a top view, and a rear view of the display device 1, respectively. The display device 1 may be used as, for example, a television set, and a main body portion including a display panel (a liquid crystal panel 11) is supported by a stand (a stand 14) and maintained in a predetermined posture state. Thus, the display device 1 may be used in a stationary type that may be placed on a horizontal plane such as a floor, a shelf, or a table, but may be used in a wall-mounted type in a state with the stand 14 detached from the main body portion.

The display device 1 includes, for example, a speaker section 12 (a sound output member) on an end portion along one axis of the liquid crystal panel 11 (here, the right and the left end portions in an X direction). Decorative members 13 are put over top and bottom surfaces of the liquid crystal panel 11, and a rear surface (an opposite surface to a display screen) is covered with a rear casing member (a rear cover, not illustrated in FIG. 1). Inside the decorative members 13, belt-like illumination sections 15, which will be described later, are embedded.

(Liquid Crystal Panel 11)

The liquid crystal panel 11 may have a configuration in which, for example, optical sheets, a light guide plate, and a reflective member, and so on are provided on one surface side of a liquid crystal cell (a back surface side of the display device 1). The liquid crystal cell may have a configuration in which liquid crystal is sealed between a pair of substrates, and may include, for example, a source driver and a source substrate in order to drive the liquid crystal cell. The optical sheets or the like may include, for example, a diffusion plate, a diffusion sheet, a lens film, a polarized light separation sheet, and so on. The light guide plate is adapted to guide light from a light source (not illustrated) toward the liquid crystal panel 11 side, and may be configured including mainly, for example, a transparent thermo-setting resin such as a polycarbonate resin (PC) or an acrylic resin (for example, polymethyl methacrylate (PMMA), and so on). The reflective member is adapted to allow light emitted toward a rear side of the light guide plate to be returned into the light guide plate, and may be a plate-like or sheet-like member such as foamed polyethylene terephthalate (PET), a silver-evaporated film, a multi-layered reflective film, or a white-color PET.

Main components (the liquid crystal cell, the optical sheets, the light guide plate, and the reflective member) of the liquid crystal panel 11 are all configured of thin plate-like or sheet-like flexible members made of glass or a resin. Therefore, the liquid crystal panel 11 has flexibility as a whole.

Figure 3:
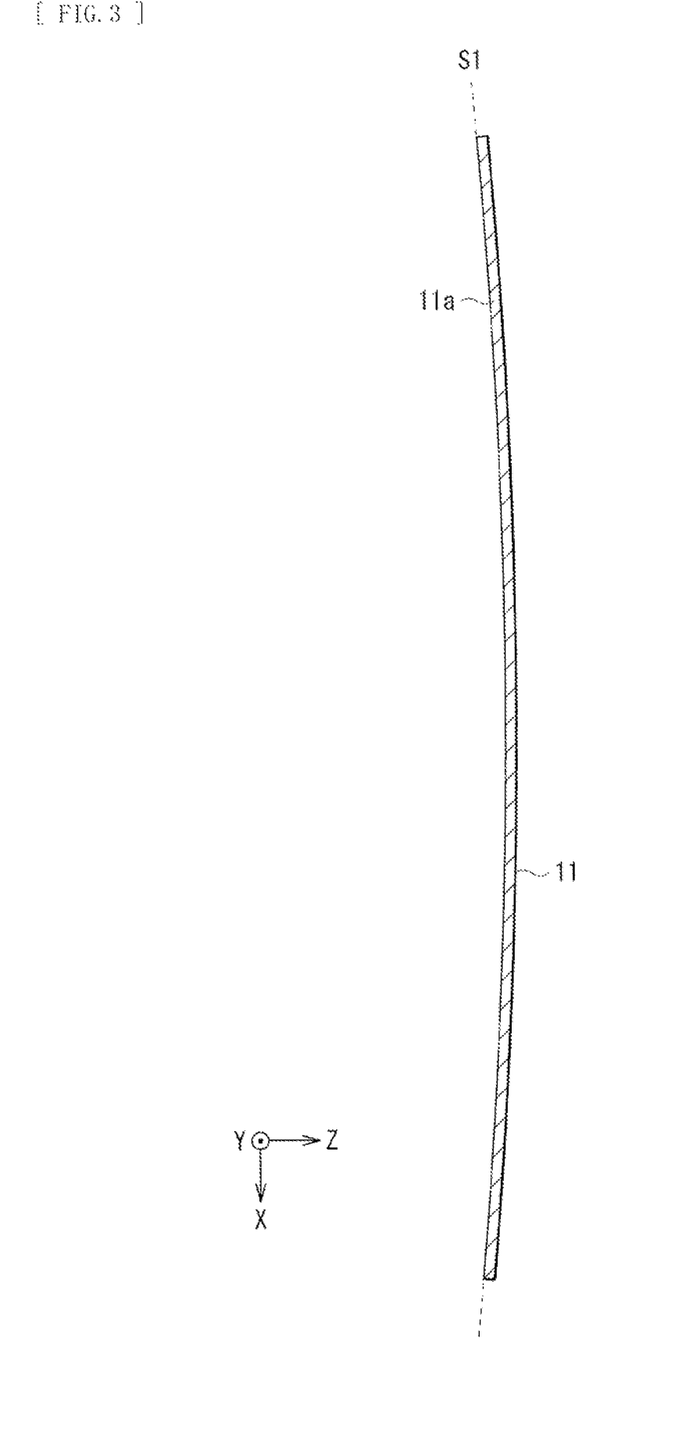
FIG. 3 is a cross-sectional view illustrating one configuration example of a display panel illustrated in FIG. 1.

The liquid crystal panel 11 has a rectangular shape in XY plan configuration, and has a curved shape in section (in XZ section) along one axis (the X direction) (has a curved portion in an arc shape along one axis). FIG. 3 illustrates one example of the XZ section of the liquid crystal panel 11. As illustrated, in the present embodiment, the liquid crystal panel 11 is curved gently from a center portion toward end portions in the X direction, at a constant curvature. Also, the liquid crystal panel 11 is curved with a concave surface facing toward the front side (the display side) (is protruded toward the rear side (the back surface side)), and a display screen 11a of the liquid crystal panel 11 constitutes a concave curved surface S1. In this way, when an observer sees the liquid crystal panel 11 from the front, the center portion is visually recognized to be gradually narrowed than the right and the left end portions, making it possible to give feeling of immersion by a visual effect of perspective.

Figure 4:
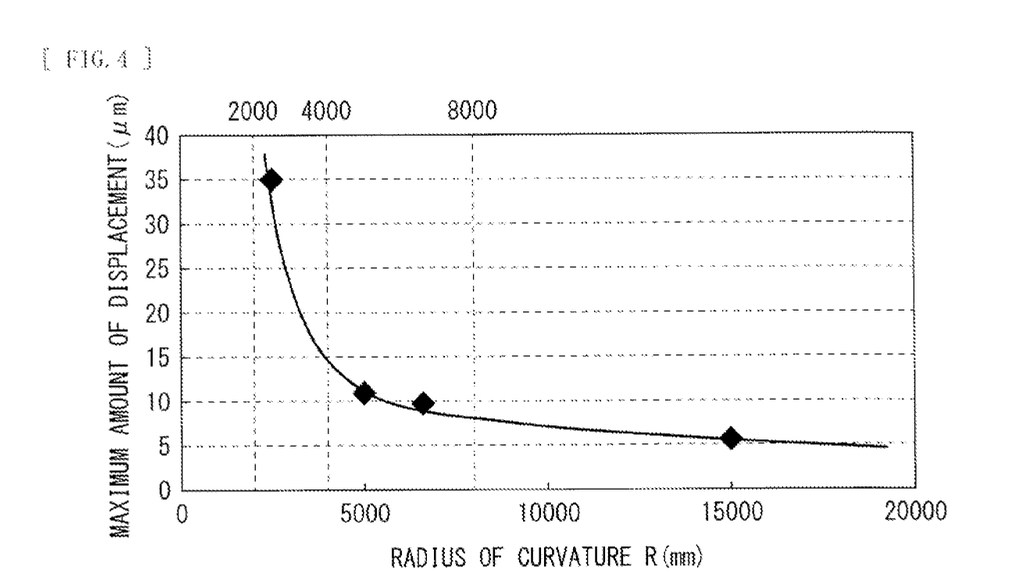
FIG. 4 is a characteristic diagram illustrating relationship between a radius of curvature of the display panel and a maximum amount of glass displacement.

A radius of curvature R of the curved shape of the liquid crystal panel 11 (a radius of curvature of the concave curved surface S1) is larger than 2000 mm. Moreover, for example, in a case that the display screen 11a is large-sized (for example, 40 inches or greater), for example, 4000 mm to 8000 mm both inclusive may be desirable, specifically 6000 mm. FIG. 4 illustrates relationship between the radius of curvature R (mm) and a maximum amount of displacement (μm) of glass substrates (a screen size: 55 inches). The liquid crystal cell in the liquid crystal panel 11 has a configuration in which a liquid crystal material is interposed between two glass substrates, and when the liquid crystal cell is deformed, there occurs a planar displacement between the two glass substrates in some cases. The maximum amount of displacement of the glass substrates indicates an amount of such planar displacement. When a positional displacement of the glass substrates occurs, a black matrix layer formed on a surface of one glass substrate and a color filter layer formed on another opposite glass substrate are disposed to be displaced from desired positions, causing lowered brightness or color mixing, which may adversely affect image quality.

Figure 5:
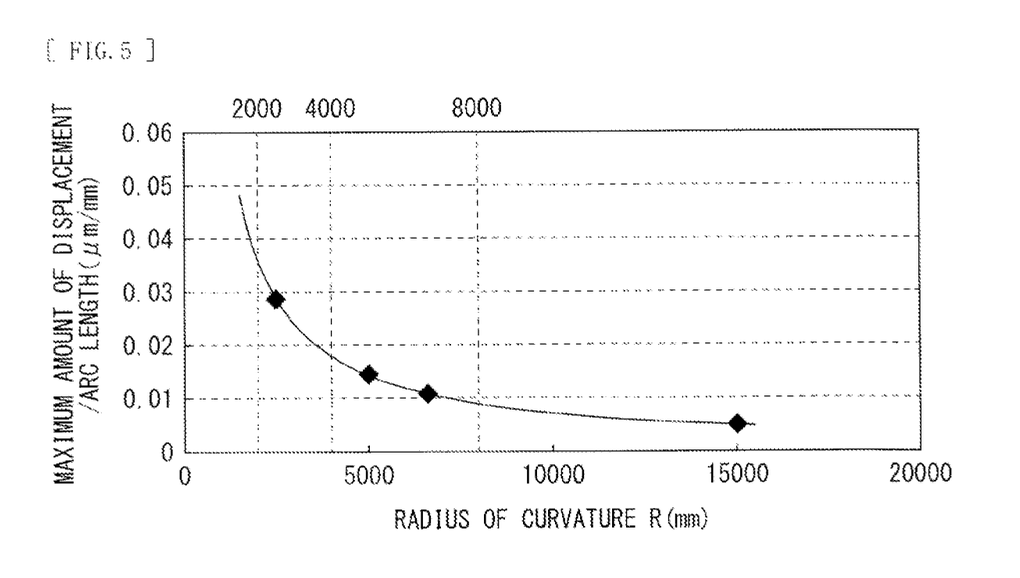
FIG. 5 is a characteristic diagram illustrating relationship between the radius of curvature and the maximum amount of displacement in a case that a screen size is varied.

Moreover, regarding the maximum amount of displacement (μm) with respect to the radius of curvature R (mm) as described above, similar measurement was carried out with the cases of the screen sizes of 40 inches and 65 inches. Then, as illustrated in FIG. 5, similar tendency to the case of the screen size of 55 inches was found. Such tendency is considered to occur similarly with the screen size larger than 65 inches. However, a vertical axis of FIG. 5 indicates ratios of the maximum amount of displacement (μm) with respect to the arc length (corresponding to the screen size: mm) along the vertical axis.

As illustrated in FIGS. 4 and 5, when the radius of curvature of the curved shape is too small, the maximum amount of displacement of the glass substrates tends to increase rapidly. In particular, when the radius of curvature R is 2000 mm or less, the glass substrate cracks, failing in maintaining the curved shape, as has been found in an experiment. Accordingly, by allowing the radius of curvature R of the curved shape to be larger than 2000 mm, it is possible to restrain cracking of the glass substrate and to maintain manufacturing properties. Here, it is desired to attain various curved shapes according to applications of the display device.

Figure 6:
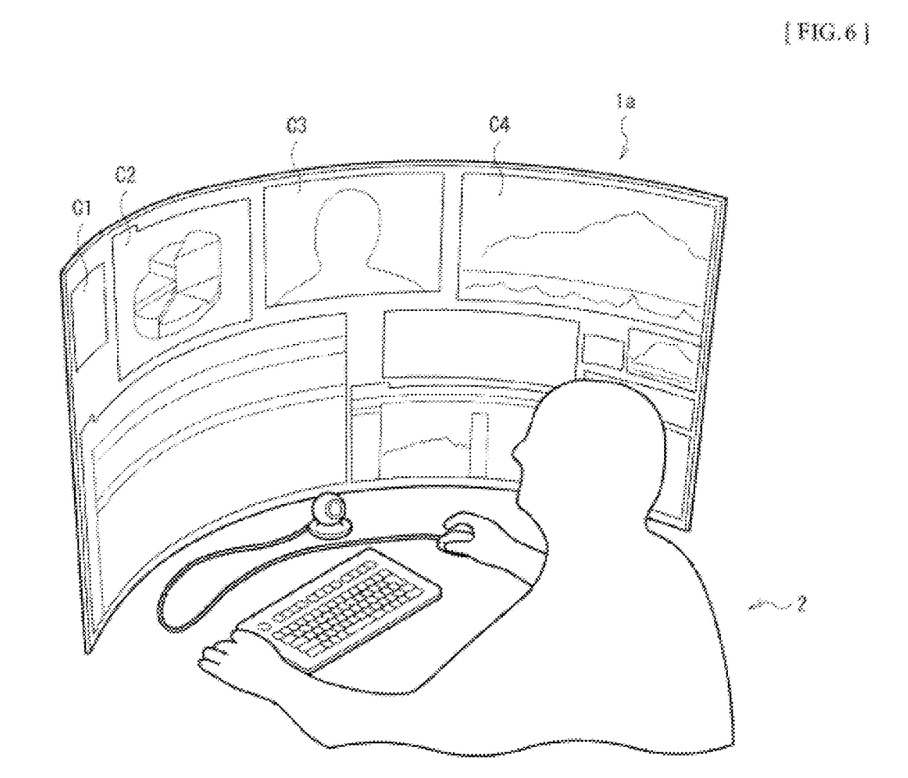
FIG. 6 is a schematic diagram illustrating one example of a curved shape.

For example, as illustrated in FIG. 6, in a display 1a that has a curved shape of an extremely small radius of curvature R, surrounding an entire visual filed of a user 2, it is desirable that the curved shape be designed in a range where the radius of curvature R is not equal to or smaller than 2000 mm. The display 1a is adapted, for example, to allow a plurality of contents (C1, C2, C3, C4 . . . ) including various images, pictures, characters, and so on to be displayed on one screen, and is suitable for use in applications to present many pieces of information.

On the other hand, in a case of designing a curved shape for displaying pictures such as movies and giving feeling of immersion to the user (the observer), when the radius of curvature is smaller than 4000 mm, the observer tends to feel uncomfortable; on the contrary, when larger than 8000 mm, there are difficulties in giving feeling of immersion as intended, though the maximum amount of displacement is reduced, as has been found statistically. Accordingly, it is desirable that the radius of curvature R of the curved shape of the liquid crystal panel 11 be larger than 2000 mm in view of manufacturing properties, in particular 4000 mm to 8000 mm both inclusive in applications in which feeling of immersion is appreciated.

It is to be noted that in the curved shape of the liquid crystal panel 11, in the X direction, the radius of curvature is not necessarily constant. For example, there may be an inflexion point where the curvature changes at a certain point toward the end portion; alternatively, there may be a local region that has a different curvature from that of other regions. However, it is desirable that the curved shape be symmetric with respect to the center portion in the X direction of the liquid crystal panel 11. Moreover, it is desirable that the curved shape do not include a linear portion extending in the X direction in a space between the observer and the display screen (for example, 50 mm or less); it is more desirable that the curved shape be entirely configured of curved portion.

(Speaker Section 12)

Figure 7:
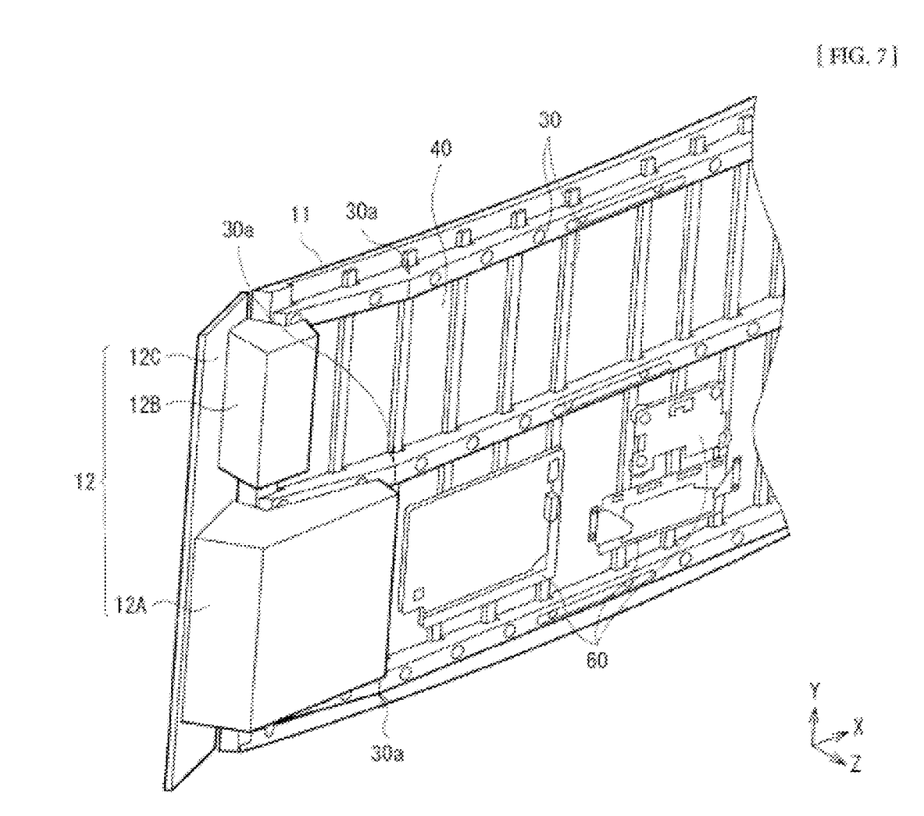
FIG. 7 is a cross-sectional view for explaining one configuration example of a speaker section illustrated in FIG. 1.

FIG. 7 is a perspective view of configuration of a main part of the display device 1 viewed from back surface side. Specifically, illustrated are the liquid crystal panel 11 and the speaker section 12, and a frame member 30 and a plate member 40 that support the curved shape of the liquid crystal panel 11. The speaker section 12 is provided in the end portions in the X direction of the liquid crystal panel 11, specifically, in regions along two opposite short sides among sides of the rectangular shape of the liquid crystal panel 11. Thus, in the display device 1, the speaker section 12 is provided in the right and the left end portions of the liquid crystal panel 11. However, though in FIG. 7 illustration on one end portion side is omitted for simplicity, the speaker section 12 is also provided on another end portion of the liquid crystal panel 11 in a horizontally symmetrical form. By disposing the speaker section 12 on the right and the left ends of the liquid crystal panel 11, picture and sound are effectively in harmony, making it possible to enhance feeling of immersion by combination of the above-mentioned visual effects by the curved shape of the liquid crystal panel 11 and auditory effects by the speaker section 12.

The plate member 40 is a flexible plate made of metal or a resin. On a back surface side of the plate member 40, the frame member 30 is provided, and also substrates and the like 60 are mounted, which include the source substrate, a timing controller substrate, a driver substrate that is configured to control the backlight light source, and so on. The fame member 30 extends in one direction (the X direction and a Y direction) in the back surface of the plate member 40. On a front surface of the plate member 40, the liquid crystal panel 11 is stacked. The frame member 30 and the plate member 40 have curved shapes in an arc form along the X direction, allowing the curved shape of the liquid crystal panel 11 to be maintained. However, configurations of the frame member 30 and the plate member 40 are exemplary and non-limiting to this configuration as long as the curved shape of the liquid crystal panel 11 is maintained.

In the proximity of the right and the left ends of the side surfaces of the frame member 30, it is desirable that a bent portion 30a that is bent forwardly (toward the display side) be provided. Thus, a large space is formed between the frame member 30 and the undepicted rear casing member, making it easier to secure capacity of the speaker section 12, which will be described later.

At the right and the left end portions of the liquid crystal panel 11, at least part of the speaker section 12 is provided overlapping the back surface of the liquid crystal panel (is provided extending toward or wrapping around the back surface side). It is to be noted that an outer surface of the rear casing member 14 may have a similar curved shape to that of the liquid crystal panel 11, but, for example, as illustrated in (C) of FIG. 2, a flat surface may be preferable. Thus, at the right and the left end portions of the liquid crystal panel 11, a large space is formed between the liquid crystal panel 11 and the rear casing member, making it easier to secure capacity of the speaker section 12, which will be described later.

The speaker section 12 is a speaker box that includes, for example, one or more speaker units (here, two speaker units 12A and 12B); on a sound output side of the speaker units 12A and 12B, for example, a speaker grille 12C (a speaker net) is provided. The speaker units 12A and 12B are devices that are adapted to output sound (including music and sound effects) to the outside, and are stacked vertically on each other at the right and the left portions of the liquid crystal panel 11. In such a configuration, for example, the speaker unit 12A may be configured to function as a main speaker, while the speaker unit 12B may be configured to function as a sub speaker.

(Stand 14)

Figure 8:
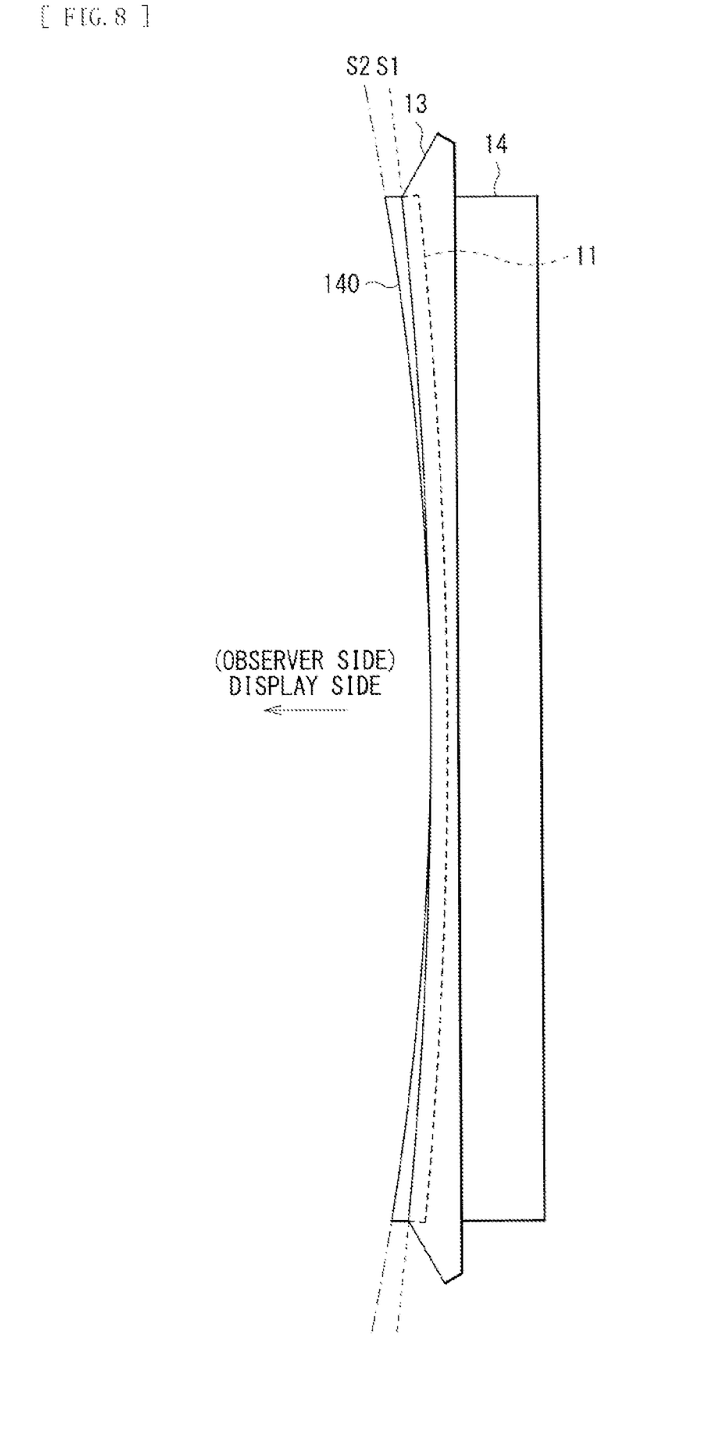
FIG. 8 is a top view illustrating examples of curved shapes of the display panel and a stand illustrated in FIG. 1.

The stand 14 is attached to a lower portion of the back surface of the liquid crystal panel 11 by a link member 17 ((D) of FIG. 2). In the stand 14, an edge portion on the display side (the observer side, the front side) has a predetermined curved shape in accordance with the above-mentioned curved shape of the liquid crystal panel 11. FIG. 8 illustrates a configuration of a main part of the display device 1 (the liquid crystal panel 11, the decorative member 13, and the stand 14) viewed from the top surface. As illustrated, an edge portion 140 on the display side of the stand 14 may have a concave curved surface S2 whose radius of curvature is smaller than that of the display screen (the concave curved surface S1) of the liquid crystal panel 11. On the other hand, a back surface side of the stand 14 may be provided extending largely beyond the liquid crystal panel 11, and an edge portion on the back side does not have a curved shape. Thus, for example, only part of the right and the left end portions of the stand 14 is provided extending forwardly of the liquid crystal panel 11, while most of the stand 14 is disposed hidden below or behind the liquid crystal panel 11 (unseen by the observer). Accordingly, designability of the display device 1 is enhanced. The radius of curvature of the curved shape of the stand 14 may be preferably smaller than the radius of curvature R of the liquid crystal panel 11, specifically 4100 mm. It is to be noted that, since the circuit boards or the like to drive the liquid crystal panel 11 are disposed in the vicinity of the center of the back surface of the liquid crystal panel 11, there is little possibility that the center of gravity of the liquid crystal panel 11 is largely shifted even when the liquid crystal panel 11 has a curved shape.

Figure 9A:
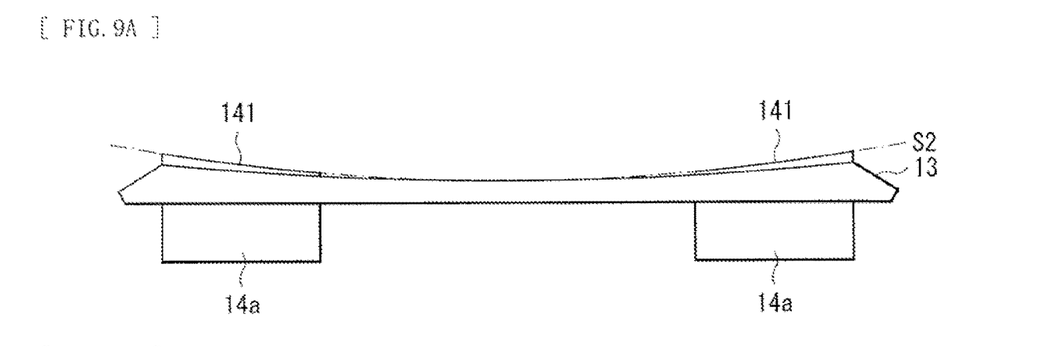
FIG. 9A is a top view illustrating another configuration example of the stand illustrated in FIG. 1.
Figure 9B:
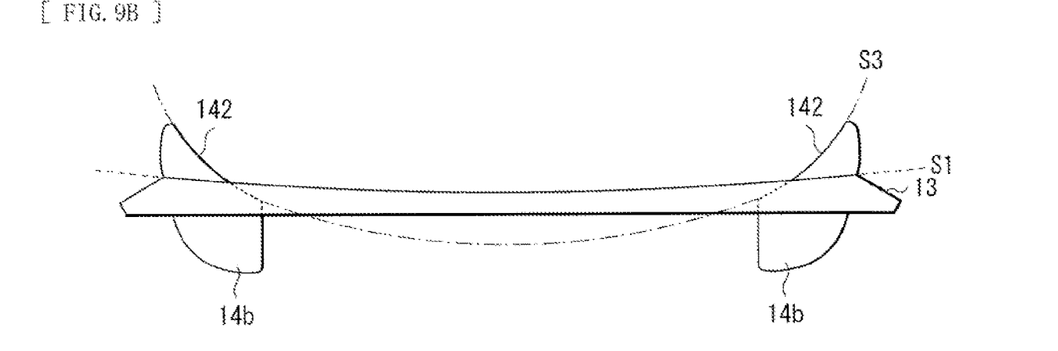
FIG. 9B is a top view illustrating another configuration example of the stand illustrated in FIG. 1.
Figure 9C:
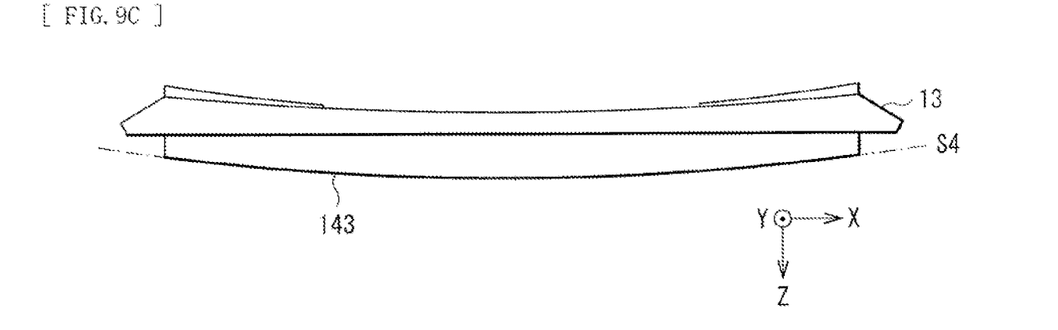
FIG. 9C is a top view illustrating another configuration example of the stand illustrated in FIG. 1.

FIGS. 9A to 9C illustrate other examples of the stand 14 having the curved shapes as described above. In the above-mentioned example, the stand 14 has a continuous (integral) shape along a long side of the liquid crystal panel 11; however, as illustrated in FIG. 9A, a shape separated into the right and the left may be possible (stands 14a may be provided on each of the right and the left end portions of the liquid crystal panel 11). However, also in this case, it is desirable that the respective edge portions 141 of the two stands 14a have the curved shapes that constitute the same concave curved surfaces S2. Alternatively, on the right and the left end portions of the liquid crystal panel 11, stands 14b as illustrated in FIG. 9B may be provided. Also in this case, it is desirable that the respective edge portions 142 of the two stands 14b have curved shapes that constitute a same concave curved surfaces S3. Furthermore, as illustrated in FIG. 9C, an edge portion 143 on the back surface side of the liquid crystal panel 11 may have a curved shape that constitutes a curved surface S4. A radius of curvature of the curved surface S4 of the edge portion 143 on the back surface side is not particularly limited; moreover, the curved surface S4 may be either a concave curved surface or a convex curved surface.

(Belt-Like Illumination Section 15)

In the present embodiment, in at least part of a peripheral region of the display screen of the above-mentioned liquid crystal panel 11, the belt-like illumination section 15 is provided. Here, as illustrated in FIG. 1, inside the decorative members 13 that are put over the top portion and the bottom portion of the liquid crystal panel 11, the belt-like illumination sections 15 are provided. That is, the belt-like illumination sections 15 are provided along top and bottom sides of the frame region of the liquid crystal panel 11. Moreover, by providing inside the decorative member 13, it is possible to allow light of color according to displayed image to be emitted from through the decorative members 13 toward an observer.

Figure 10:
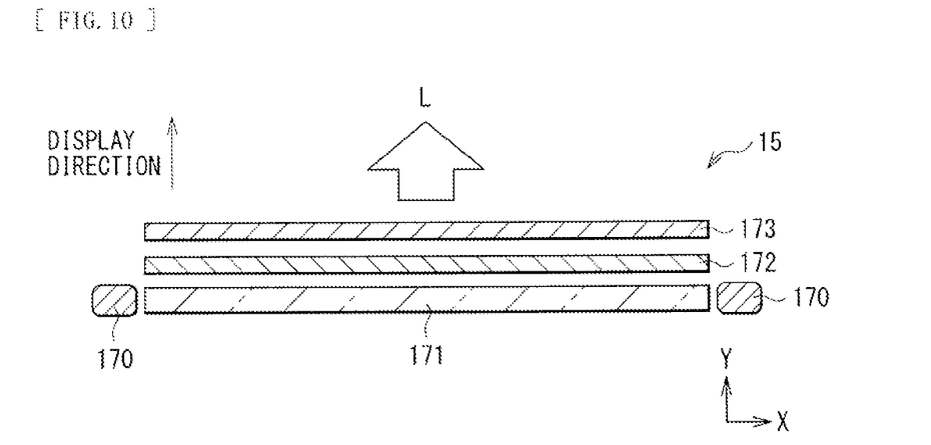
FIG. 10 is a cross-sectional view illustrating an overall configuration of a belt-like illumination section illustrated in FIG. 1.

FIG. 10 illustrates a cross-sectional configuration of the belt-like illumination section 15. The belt-like illumination section 15 is an illumination device that may include, for example, an LED light source 170, a light guide plate 171 that allows light produced from the LED 170 to be surface-emitted, optical function layers (a diffusion plate 172 and a dimmer filter 173) that are stacked on the light guide plate 171.

The light guide plate 171 may be an acrylic plate of a thickness of, for example, 2 mm, to one surface of which a general light scattering processing is applied. On the right and the left end portions of the light guide plate 171, the LED light source 170 may be provided. The LED light source 170 may incorporate LED chips of three colors, i.e. R, G, and B that are individually lighting-controlled; by the lighting control of them, in the belt-like illumination section 15, color light of various tones is allowed to be emitted. The diffusion plate 172 may have configuration in which light scattering agent is mixed in a resin, and may be a resin plate that is generally used in a liquid crystal display device. The dimmer filter 173 may have a configuration in which a black resin is mixed in a transparent resin. By providing the dimmer filter 173 on the display side (the observer side, the front side), at the time of non-emission of the LED light source 170, black color is observed, while at the time of emission of the LED light source 170, the color of the emitted light is observed.

By providing the belt-like illumination section 15 inside the decorative member 13, it is possible to illuminate the top and bottom sides of the frame of the liquid crystal panel 11 from black to arbitrary color and brightness. Here, the above-mentioned effects that are similar to those of perspective due to the curved shape of the liquid crystal panel 11 are largely affected by visual impressions of a peripheral region of the display screen. Accordingly, by illuminating the top and bottom sides of the frame of the liquid crystal panel 11 from black to arbitrary color and brightness, it is possible to adjust visual effects such as three-dimensional feeling, feeling of presence, and so on without physically changing the curved shape. For example, in a case that the peripheral region of the display screen is in color and brightness that are hardly visually-recognized, such as a black color, effects of the curve is minimized; on the contrary, in a case of color and brightness that are easily visually-recognized, such as a white color, effects of the curve is maximized Consequently, it is possible to change color of the frame according to, for example, the environment of the display device 1 (brightness in a room, color of a wall or a setting table, and so on), making it possible to give enhanced feeling of immersion.

It is to be noted that, in the above-described embodiment, in the peripheral region (a non-display region) of the display screen of the liquid crystal display panel, as illustrated in (A) of FIG. 2, it is desirable that a width A in the vertical direction (the Y direction) and a width B in the horizontal direction (the X direction) satisfy A:B=1:3 or more (B/A is 3 or more). For example, in a case that the width A in the Y direction of the decorative member 13 is 30 mm, the width B in the horizontal direction is 120 mm including the speaker section 12. Moreover, the width A of the decorative member 13 may be different between the top and the bottom; for example, a width of the decorative member 13 on the top side may be 30 mm while a width of the decorative member 13 on the bottom side may be 50 mm. It is to be noted that, in the case that the widths are set to be different between the top and the bottom of the display screen, the above-mentioned condition may be satisfied with A as an average value of the widths on the top and bottom sides. The use of such a ratio easily provides a sense of feeling as if an aspect ratio of the display screen was higher, enhancing sense of unity and feeling of presence.

(Functions and Effects)

As described above, in the present embodiment, since the radius of curvature (R) of the curved shape of the liquid crystal panel 11 is larger than 2000 mm, it is possible to restrain cracking of the liquid crystal panel (the glass substrates) and to maintain the curved shape. Thus, it is possible to attain curved shapes according to applications, such as a gently curved shape that gives feeling of immersion without uncomfortable feeling, or an extremely curved shape that surrounds an entire visual field of a user. Hence, it is possible to obtain a desired curved shape as well as to maintain manufacturing properties.

Moreover, the speaker section 12 is provided on the end portion of the liquid crystal panel 11 having a predetermined curved shape, and at least part of the speaker section 12 is provided on a back surface opposite to the display screen. Thus, it is possible to use space on the back surface of the panel, which is formed by the curved shape of the liquid crystal panel 11, as setting space of the speaker section 12.

Figure 11A:
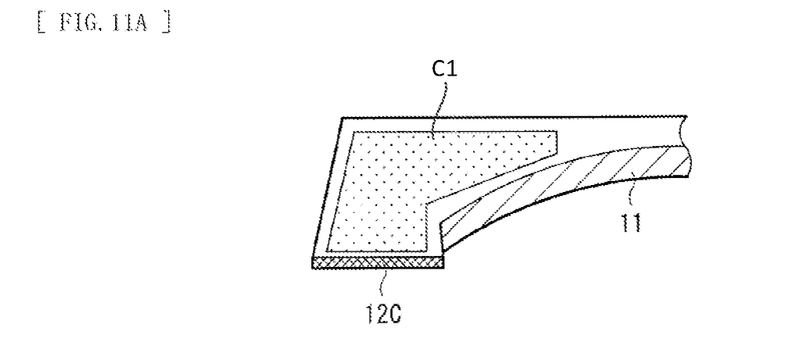
FIG. 11A is a schematic diagram for explaining effects of the display device illustrated in FIG. 1.
Figure 11B:
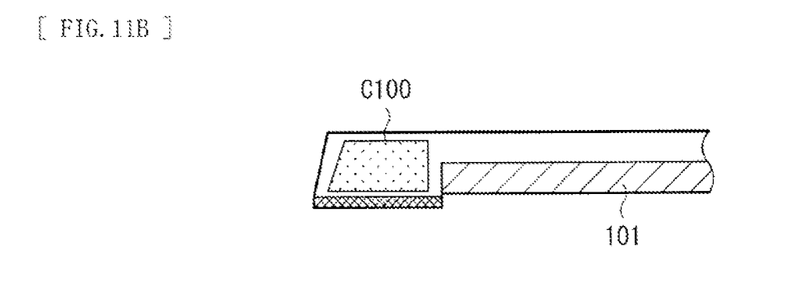
FIG. 11B is a schematic diagram for explaining effects of the display device illustrated in FIG. 1.

Here, FIG. 11A schematically illustrates setting space of the speaker section 12 (of speaker capacity C1) according to the present embodiment, while FIG. 11B schematically illustrates, as a comparative example, speaker capacity C100 of an FPD including a conventional flat liquid crystal panel 101. As illustrated in FIG. 11B, in the comparative example, there is not enough space on the back surface side of the liquid crystal panel 101, only a region facing the side surface of the liquid crystal panel 101 is available for speaker capacity. In the present embodiment, since the liquid crystal panel 11 has a predetermined curved shape, there is formed large space on the back surface side in addition to the region facing the side surface of the liquid crystal panel 11, making it possible to use the space to secure large speaker capacity C1. Therefore, in the present embodiment, it is easier to secure the capacity of the speaker section 12 as compared to an FPD. Thus, in the speaker section 12, it is possible to attain, for example, an increase in output or enhancement of sound quality, or the like. Accordingly, it is possible to synergistically obtain auditory effects due to enhanced performance of the sound output member in addition to visual effects (three-dimensional feeling, sense of unity, and feeling of presence) due to the curved shape of the liquid crystal panel 11. It is possible for an observer to obtain enhanced feeling of immersion in a displayed image.

Although description has been made by giving the example embodiment as mentioned above, the contents of the present disclosure are not limited to the above-mentioned example embodiment and may be modified in a variety of ways. For example, in the above-described example embodiment, the front portion (the speaker grille 12C) of the speaker section 12 is provided along a different plane direction from the display screen of the liquid crystal panel 11 (a link portion between the panel and the speaker is bent). The arrangement of the speaker section 12 is not limited to this, and, for example, the speaker section 12 may be provided along a same plane direction as the display screen (the link portion between the panel and the speaker is flat).

Moreover, in the above-described example embodiment, there has been exemplified a case that the radius of curvature of the curved shape of the liquid crystal panel 11 is constant; however, the radius of curvature of the curved shape is not necessarily constant, but may be gradually varied, or alternatively, a partial region may have a different radius of curvature from that of other regions. Similarly, the curved shape of the stand 14 is not limited to a case that the radius of curvature is constant.

Further, for example, a material and a thickness of each layer as described in the above-mentioned example embodiment are not limited to as exemplified above, but other materials and other thicknesses may be adopted.

Furthermore, for example, in the above-described example embodiment, description has been given on specific configurations of the display device 1 (television set). However, it is not necessary to include all the components, and another component or other components may be further provided.

The present disclosure may be widely applied to an electronic apparatus in various fields that is configured to display an image or a picture based on a picture signal input from outside or generated inside; specifically, a personal computer (PC) monitor, a public display, and so on, as well as a television set that has been explained in the above-described example embodiment.

It is to be noted that the contents of the present disclosure may have the following configurations.

(1)
A display device including a display panel having a curved shape in section along one axis, the display panel including a display screen that includes a concave surface,
wherein a radius of curvature (R) of the curved shape of the display screen is larger than 2000 mm.
(2)
The display device according to (1),
wherein the radius of curvature (R) of the curved shape of the display screen is 4000 mm to 8000 mm both inclusive.
(3)
The display device according to (1) or (2), including a stand that supports the display panel,
wherein an edge portion, on an observer's side, of the stand has a curved shape whose radius of curvature is smaller than the radius of curvature of the display panel.
(4)
The display device according to any one of (1) to (3), further including a sound output member,
wherein, at an end portion, along the one axis, of the display panel, at least part of the sound output member is provided overlapping an opposite surface to the display screen of the display panel.
(5)
The display device according to any one of (1) to (4), including an illumination section that is provided in at least part of a peripheral region of the display screen of the display panel, the illumination section being capable of controlling and changing at least one of brightness and color.
(6)
The display device according to (5),
wherein the display panel has a rectangular shape, and
the illumination section is provided in a belt-like region along two opposite long sides of the rectangular shape of the display panel.
(7)
The display device according to any one of (1) to (6),
wherein the display panel has a rectangular shape and has the curved shape in section along a longitudinal direction of the rectangular shape, and
the sound output member is provided along two opposite short sides of the rectangular shape of the display panel.

This application claims the benefit of Japanese Priority Patent Application JP 2012-147323 filed on Jun. 29, 2012, and JP 2012-238707 filed on Oct. 30, 2012, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A display device comprising:
a display panel having a curved shape in a cross-section along one axis, the display panel including a display screen that includes a concave curved surface; and
an illumination section provided in at least part of a peripheral region of the display screen of the display panel, the illumination section including a light guide plate that extends along the peripheral region and at least one LED light positioned at a first end of the light guide plate to emit light into the light guide plate so as to control and change brightness to adjust visual effects associated with the curved shape, and
a frame member supporting the display panel comprising parallel first support members running along the one axis and more than two spaced apart second support members running along another axis, perpendicular to the one axis, that extends to the first support members,
in which a radius of curvature (R) of the concave curved surface of the display screen is constant such that the radius of curvature (R) has a single value for the display screen in its entirety and in which the single value is at least 6000 mm and does not exceed 8000 mm.
2. The display device according to claim 1, further comprising a sound output member, and
wherein, at an end portion, along the one axis, of the display panel, at least part of the sound output member is provided overlapping an opposite surface to the display screen of the display panel.
3. The display device according to claim 1, in which the display panel has a rectangular shape, and in which the illumination section is provided in a belt-like region along two opposite long sides of the rectangular shape of the display panel.

4. The display device according to claim 2, in which the display panel has a rectangular shape and has the curved shape in section along a longitudinal direction of the rectangular shape, and in which the sound output member is provided along two opposite short sides of the rectangular shape of the display panel.

5. The display device according to claim 1, in which when the display panel is configured to be viewed in a viewing direction so as to provide a front view of the display panel having a first axis in a longitudinal direction and a second axis which is perpendicular to the first axis, a first distance as measured along the first axis of a non-display region on one short side of the display screen has a value which is at least three times that of a second distance as measured in along the second axis of at least one belt-like region along one opposite long side of the illumination section.

6. A display device comprising:
a display panel having a curved shape in a cross section along one axis, the display panel including a display screen that includes a concave surface, wherein a radius of curvature of the curved shape of the display screen is larger than 2000 mm;
an illumination section provided in at least part of a peripheral region of the display panel, the illumination section including a light guide plate that extends along the peripheral region and at least one LED light positioned at an end of the light guide plate to emit light into the light guide plate so as to control and change brightness;
a frame member supporting the display panel comprising three parallel spaced apart first support members running along the one axis and a plurality of second support members running along another axis, perpendicular to the one axis, that extends to the first support members, and
a rear casing member having a curved shape.

7. The display device according to claim 6, wherein the radius of curvature of the curved shape of the display screen is 4000 mm to 8000 mm.

8. The display device according to claim 6, wherein comprising a stand that supports the display panel, wherein an edge portion, on an observer's side, of the stand has a curved shape whose radius of curvature is smaller than the radius of curvature of the display panel.

9. The display device according to claim 6, wherein the radius of curvature of the curved shape of the display screen varies.

10. The display device according to claim 6, further comprising a sound output member, wherein, at an end portion, along the one axis, of the display panel, at least part of the sound output member is provided overlapping an opposite surface to the display screen of the display panel.

11. The display device according to claim 6, wherein the display panel has a rectangular shape, and the illumination section is provided in a belt-like region along two opposite long sides of the rectangular shape of the display panel.

12. The display device according to claim 11, wherein the display panel has a rectangular shape and has the curved shape in section along a longitudinal direction of the rectangular shape, and a sound output member is provided along two opposite short sides of the rectangular shape of the display panel.

13. The display device according to claim 1, wherein the illumination section is further configured to control color so as to change a color of a frame of the display device.

14. The display device according to claim 6, wherein the illumination section is further configured to control color so as to change a color of a frame of the display device.

15. A display device comprising:
a display panel having a curved shape in a cross section along one axis, the display panel including a display screen that includes a concave surface, wherein a radius of curvature (R) of the curved shape of the display screen is larger than 2000 mm;
an illumination section provided in at least part of a peripheral region of the display screen of the display panel, the illumination section including a light guide plate that extends along the peripheral region and at least one LED light positioned at an end of the light guide plate to emit light into the light guide plate so as to control and change brightness to adjust visual effects associated with the curved shape;
a frame member supporting the display panel comprising parallel first support members running along the one axis and more than two spaced apart second support members running along another axis, perpendicular to the one axis, that extends to the first support members; and
a rear casing member having a curved shape.

16. The display device according to claim 1, wherein the light guide plate comprises a belt-like structure that extends along the peripheral region of the display screen of the display panel.

17. The display device according to claim 16, wherein the at least one LED light comprises a first LED light positioned at a first end of the light guide plate and a second LED light positioned at an end of the light guide plate opposite the first end, the first and second LED lights positioned to emit light into the belt-like structure.

18. The display device according to claim 1, wherein a bottom width in a vertical direction associated with a bottom portion of the peripheral region is different than a top width in a vertical direction associated with a top portion of the peripheral region.

19. The display device according to claim 6, wherein a bottom width in a vertical direction of a bottom portion of the peripheral region is different than a top width in a vertical direction of a top portion of the peripheral region.

20. The display device according to claim 19, wherein the width in the vertical direction and the width in the horizontal direction satisfy a ratio of 1:3 or more.

21. The display device according to claim 6, wherein the peripheral region has a width in a vertical direction and a width in a horizontal direction, the width in the vertical direction and the width in the horizontal direction satisfy a ratio of 1:3 or more.

22. The display device according to claim 15, wherein the peripheral region has a width in a vertical direction and a width in a horizontal direction, the width in the vertical direction and the width in the horizontal direction satisfy a ratio of 1:3 or more.

\* \* \* \* \*